TELEPHONE SYSTEM INCLUDING COIN CONTROL CIRCUITS

Filed Dec. 1, 1960 2 Sheets-Sheet 1

INVENTOR
W. A. FISCHER
BY J. A. McCorkendale
ATTORNEY

April 16, 1963 W. A. FISCHER 3,086,082

TELEPHONE SYSTEM INCLUDING COIN CONTROL CIRCUITS

Filed Dec. 1, 1960 2 Sheets-Sheet 2

INVENTOR
W. A. FISCHER
BY J. A. McCorkendale
ATTORNEY

United States Patent Office
3,086,082
Patented Apr. 16, 1963

3,086,082
TELEPHONE SYSTEM INCLUDING COIN CONTROL CIRCUITS

William A. Fischer, Forest Hills, N.Y., assignor to Bell Telephone Laboratories, Incorporated, New York, N.Y., a corporation of New York
Filed Dec. 1, 1960, Ser. No. 73,014
10 Claims. (Cl. 179—6.31)

This invention relates to a telephone system and more particularly to a telephone system including coin control circuits.

In the operation of telephone systems which include coin operated devices, commonly referred to as pay stations or coin boxes, for use by the calling or called parties, it is apparent, of course, that some means must be included whereby the operator at the controlling central office can perform the necessary control functions, that is, "coin collect," "coin return" and "re-ring." In the past it has been common practice to provide separate direct current circuits for performing the functions involved in coin disposal and re-ring. While the performance of these arrangements has proven generally satisfactory, characteristics inherent in such direct current circuits place a definite limitation on the distance over which they function satisfactorily, and this has, in turn, controlled to some extent the maximum separation permissible between the central offices of the telephone system.

In modern communication engineering it is recognized that there are many important reasons which make desirable the further centralization of central offices of the telephone system, that is an increase in the distance between the individual offices. As a step in making this possible there has been in recent years an increasing use of so-called "inband signaling" for control purposes, that is the use of frequencies or tones which are included within the voice frequency band. This eliminates the distance limitation previously imposed by the use of the direct current control paths, since the "inband" control frequencies are subject to no more limitations in this regard than are the voice currents themselves. However, due to the inherent inclusion of the control frequencies in the voice band, and to the necessary close association of the control circuits and the speech transmission circuits, certain difficulties have frequently been experienced in the operation of the system due to interference between, and interposition of, the speech transmission currents and the control currents. For example, false operation of the control circuits has resulted on occasion from the presence on the line of impulses resulting from "flashing recall" operation by a subscriber or from a line busy tone. Obviously, for proper functioning of the system it is essential that such false operation of the control circuits by inherent operations of other parts of the system be eliminated.

Accordingly, it is an object of the present invention to improve the operation of an inband control circuit.

A more specific object of the invention is to prevent the false operation of an inband control circuit by impulses resulting from inherent operations of other circuits of the system.

In accordance with a specific embodiment of the invention three separate A.C. signals, or tones, all included in the voice frequency band, are utilized for controlling the respective functions of coin collect, coin return and re-ring at the called station line, the control being exercised at the remote control office. It will be assumed by way of example that the "coin return" frequency code is 1100 c.p.s., the "re-ring" frequency code is 700 c.p.s., and the "coin collect" frequency code is a combination of 1100 c.p.s. and 700 c.p.s. The operator at the distant central office activates a desired one of the three functions by operation of the proper key; this applies first a "wink" or on-hook signal to the line, and, subsequently, the proper frequency code depending upon the specific function desired. The wink alerts the circuit so that, when the control frequencies are transmitted, they are supplied to a receiver circuit. The A.C. signals are rectified in the receiver and operate either one or both of a pair of "slave" relays which, in turn, applies the proper potential to perform the required function.

A feature of this invention is a timer circuit which is effective to distinguish between a busy tone on the line and an off-hook signal and to cut-through a lead of the control circuit only in the event of the off-hook signal.

A further feature of the invention is means for absorbing "false" grounds produced in the control circuit by flashing recall operations, and to prevent false "alerting" of the control circuit by such false grounds.

A still further feature of the invention is means included in the timer circuit for automatically varying the closing period thereof whereby the circuit is effective for a plurality of circuit conditions.

A full understanding of the arrangement contemplated by the present invention as well as an appreciation of the various advantageous features thereof may be gained from consideration of the following detailed description in connection with the accompanying drawing, in which.

Figures 1, 3:
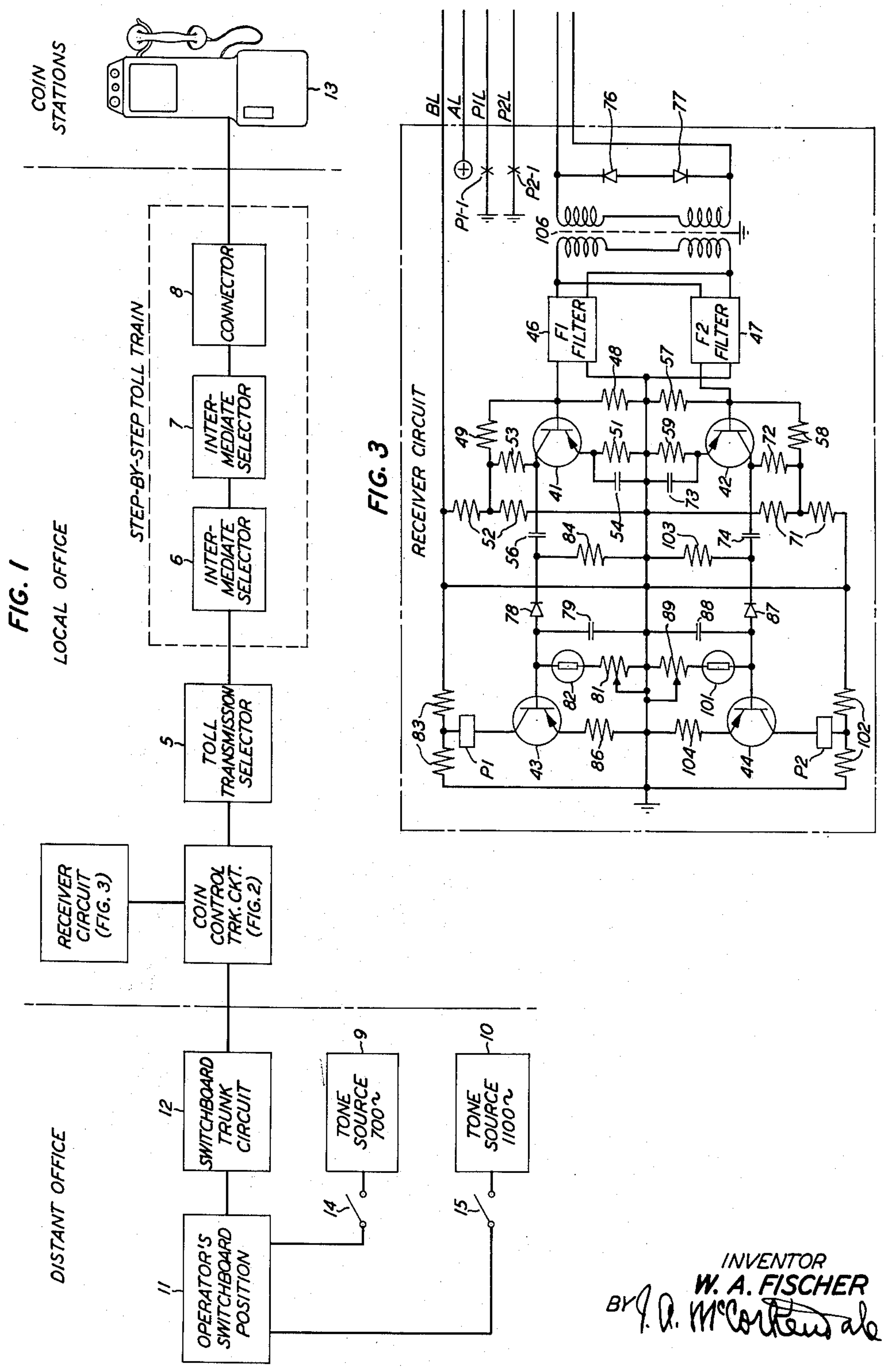
FIG. 1 shows in schematic form a portion of an automatic step-by-step telephone system of the type in which the circuits of the present invention may advantageously be incorporated.
FIG. 3 shows a receiver circuit for use with this specific illustrative embodiment.

Referring first to FIG. 1, the invention has been illustrated in connection with a coin control trunk circuit (shown in detail in FIG. 2) which is an element in a path at the local office which also includes a toll transmission selector 5 and the step-by-step toll train which comprises intermediate selectors 6 and 7 and connector 8. It will be understood that the local office path may vary in accordance with particular requirements, for example a toll incoming selector may be provided on occasion between the coin control trunk circuit and the toll transmission selector.

At the distant office two tone sources, 9 and 10, are shown associated with the operator's switchboard position 11, these sources being respectively, 700 c.p.s. and 1100 c.p.s. The distant office is shown connected to the local office over switchboard trunk circuit 12. Elements 5, 6, 7, 8, 11 and 12 will be assumed to be, respectively, any one of many such circuits well known in the art, and need not be here illustrated in detail or their operation described except insofar as desirable to describe the circuits of the present invention.

It will be assumed now for purposes of description that the system of FIG. 1 is being used in completing a call from the distant office, through the local office, to the pay station 13, and it will be assumed further that, the line with the centralization plan mentional above, the control functions, "coin collect," "coin return" and "re-ring," for station 13 are to be exercised at the distant office rather than at the local office and, further, that frequencies within the voice frequency band are being used for these control functions. It will be assumed also that in this instance the incoming call is to be paid for by the called subscriber at pay station 13. Pay station 13 will be assumed to be equipped with coin control mechanism of suitable type; such apparatus is well known in the art.

The coin control trunk circuit is shown in detail in FIG. 2 and the receiver circuit is shown in detail in FIG. 3; the detailed operation of these circuits will be described subsequently in connection with FIGS. 2 and 3. However, for purposes of general description of the invention in connection with FIG. 1, it will be assumed, first, that the connection has been completed to pay station 13 and that the deposited coin is to be collected. As pointed out above, it is being assumed that the coin collect frequency code is a combination of 700 c.p.s. and 1100 c.p.s., and the operator at the distant office accordingly operates both keys 14 and 15; a third key (not shown) may be provided, if desired, operation of which is effective to operate both keys 14 and 15. This is effective, first, to apply a "wink" or on-hook signal through switchboard trunk circuit 12 to the line at the local office and, subsequent, to apply the combined 1100 c.p.s. and 700 c.p.s. "coin collect" frequency code.

In a manner which will be described in detail subsequently in connection with FIGS. 2 and 3, the wink signal "alerts" the coin control trunk circuit so, that, when the A.C. signals are applied, they are supplied to the receiver circuit where they are rectified and operate the "slave" relays which, in turn, apply the required potential to perform the desired function at the called pay station 13.

In a similar manner the "coin return" operation may be instituted by operation of key 15 and the application of the coin return frequency code 1100 c.p.s., and the "re-ring" function by operation of key 14 and resultant application of the re-ring frequency code 700 c.p.s.

The alerting operation referred to above results from release of a relay in the toll transmission selector 5 following receipt of the wink or on-hook signal; release of the relay applies ground to a control lead of the coin control trunk circuit designated as the "X" lead. Now, as pointed out above features of the present invention are directed to the prevention of false alerting of the circuit through application of false grounds to the X lead. For example, if the operator had encountered a busy line condition when attempting the connection to pay station 13, the flashing indication taking place in connector 8 (60 or 120 i.p.m.) will cause false alerting signals (interrupted ground at 60 or 120 i.p.m.) to appear on control lead X of the coin control trunk circuit. Had the busy condition encountered been a "trunks busy" instead of a "line busy" the intermittent ground would then have originated at either of the intermediate selectors 6 or 7. In accordance with the novel arrangement contemplated by the invention, and as described in detail subsequently, false alerting of the coin control trunk circuit by application to the "X" lead of intermittent grounds under the above conditions is prevented by providing means for holding the "X" lead open in the presence of the intermittent grounds and for cutting-through the "X" lead only in the presence of steady grounds representing legitimate alerting signals.

After the control lead has been cut-through, intermittent grounds may again be applied thereto from connector 8 in the event the called subscriber at pay station 13 "flashes" to recall the operator. In accordance with the novel features of the invention and as also described in detail subsequently these intermittent grounds are absorbed by a novel arrangement of relays whereby to prevent false alerting of the coin control trunk circuit.

In accordance with one important aspect of my invention, a single timer circuit, which may advantageously be a gas tube timer circuit, is employed for a plurality of functions in the operation of the coin control trunk circuit, and for each of these operations the coin control trunk circuit determines that the single timer have a distinct timing interval. Among the functions performed by the timer cricuit in accordance with my invention are: (1) restoration of the trunk control circuit to normal when an alerting or wink signal has been transmitted from the distant switchboard without the subsequent appearance of the coin control signal tones; (2) the prevention of the trunk control circuit responding to spurious signals appearing at a control input lead due to a busy condition having been encountered in attempting to establish a connection through to the distant coin station; and (3) restoring the coin control trunk circuit to normal after application of re-ring signals to the coin station and after a sufficient interval to allow the associated circuitry, such as the toll transmission selector, to first restore.

In the specific embodiment of my invention illustrated herein, the timing intervals are determined by resistors connected in the gas tube timing circuit and by the operation of control relays which determine the specific resistors which are electrically included in the timer circuit for the operation of the timer circuit to perform these various functions.

Figure 2:
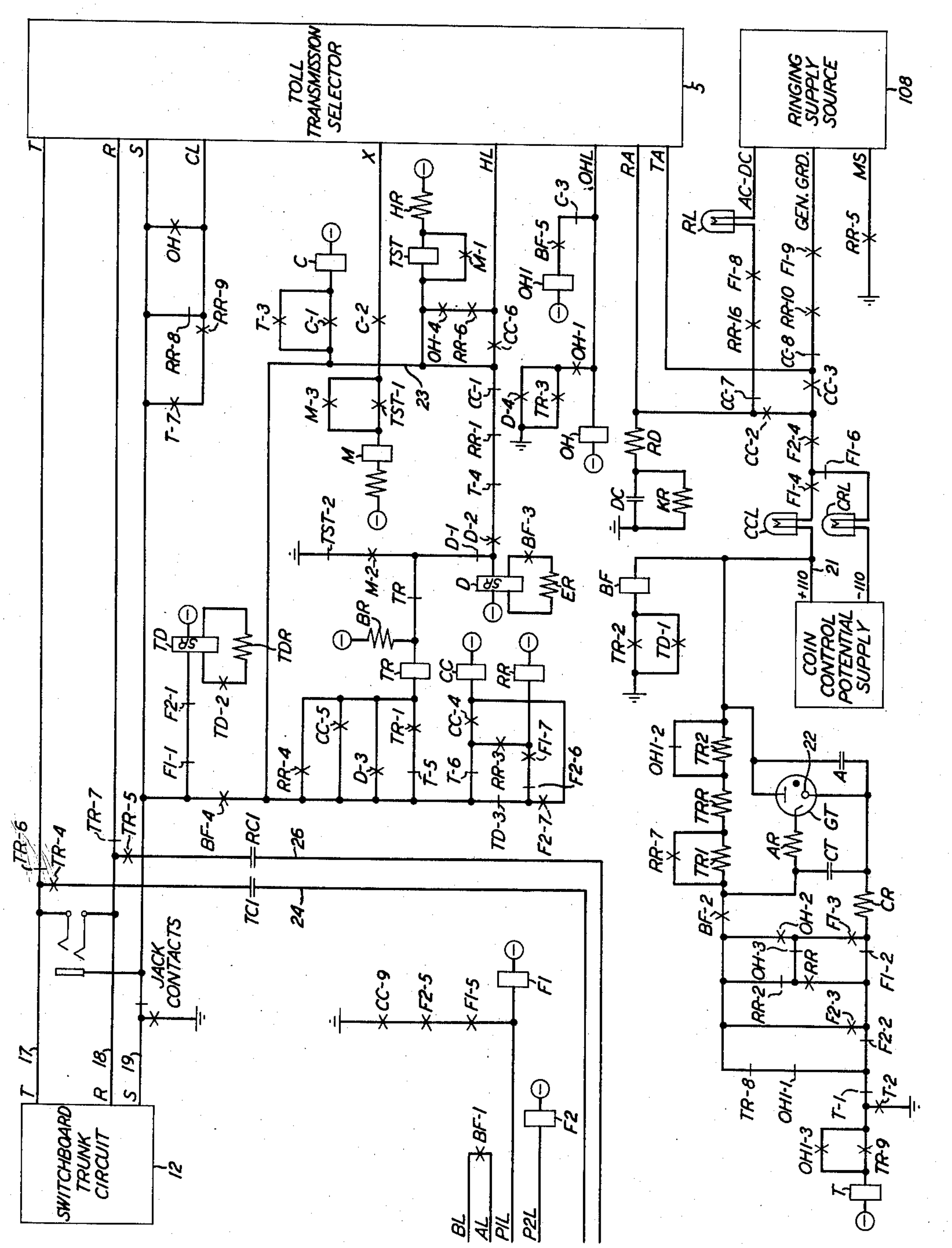
FIG. 2 shows the coin control trunk circuit of one specific illustrative embodiment of the invention.

Referring now to FIGS. 2 and 3, which should be joined right to left for consideration, it will be assumed that the coin control trunk circuit of FIG. 2 is being utilized in extending a call from the distant office, which call is incoming from switchboard trunk circuit 12 to which tip 17, ring 18 and sleeve 19 are connected, over the path at the local office to pay station 13.

Those leads of FIG. 2 which are shown connected to toll transmission selector 5, and some of which, of course, run through to the step by step switch train (FIG. 1), may be briefly identified here as to function, although the respective functions will be discussed in more detail subsequently. The T, R and S leads are the normal tip and ring (talking) conductors and the sleeve (control) conductor, respectively, the CL lead among other functions controls the ring trip relay of connector 8 of the step by step toll train, while lead X is one of the main control leads of the coin control trunk circuit, ground being applied to this lead from the toll transmission selector 5 under control of the switchboard trunk circuit 12. As will be discussed in detail subsequently, this lead is also subject on occasion to "false" grounds and novel features of the invention are directed to preventing false alerting of the circuit due to such false grounds. Lead OHL provides indication when the called subscriber is "off-hook," and lead HL controls operations in the toll train whereby to connect leads RA and TA on occasion to the called line; control potentials are applied over these leads while they have access to the called line.

When one of the associated circuits, that is, for example, toll transmission selector 5, is seized by a closure of its input loop, it will function in its normal operation to place ground on sleeve lead 19 of the coin trunk control circuit. The ground on the sleeve lead holds the preceding switch train and operates relay TD over an obvious path which includes break contacts F1–1 of relay F1 and F2–1 of relay F2.

Relay TD in operating completes an operating path for relay BF traced from positive 110V coin potential on lead 21, winding of relay BF, make contact TD–1 of relay TD to ground. Relay BF operates over this path and controls certain essential steps in the operation of the circuit which will be described subsequently. Since the operating winding of relay BF is directly in series with the coin potential, failure of the latter will prevent operation of the relay, or cause its release if already operated, thus preventing certain malfunctions of the overall circuit which will be pointed out subsequently.

Operation of relay BF closes at its BF–1 make contact an energizing path over leads AL and BL for the receiver circuit (FIG. 3); this energizing path which will be described subsequently in connection with the detailed description of the receiver circuit, serves to energize the receiver circuit at the outset of the call and to bring it to a fully stabilized condition before the time of its actual functioning.

Operation of relay BF also partially completes at its BF–2 make contact a path included in the gas tube timing circuit for subsequent operation thereof; completes at its BF-3 make contact a closing path through resistor ER for the secondary winding of relay D, thereby making the relay, in effect, slow to release; partially completes at its BF-4 make contact the operating paths of relays TR, CC, RR and the locking path for relay D; and connects at its make contact BF-5 the winding of relay OHI to lead OHL. Relay BF, operated, also completes at its BF-4 make contact an obvious operating path from the sleeve ground for relay TST; this path includes resistor HR.

Relay TST upon operating partially completes at its TST-1 make contact an operating path for relay M. Relay M is an important element in the arrangement provided in accordance with one feature of the present invention for preventing false operation of the coin control trunk circuit due to flashing recall operations, and its operation and functions will be described in detail subsequently.

*Called Party Answer*

Let us assume now for purposes of description that the called party at pay station 13 answers the call. Through the normal operation of the associated interconnecting circuits, including connector 8 (FIG. 1), ground is applied to lead OHL of the coin control trunk circuit when the called subscribed removes his receiver and closes the line loop. Relay OH operates over an obvious path and provides indication to the circuit that the called subscriber is "off-hook." Relay OHI also operates at this time since relay BF is in operated position; relay OHI is an important element in the arrangement provided in accordance with one feature of the present invention for preventing false operation of the coin trunk control circuit under certain conditions and its functions will be described in detail subsequently. At the present stage of circuit operations its operated function is not required, and it is, as a matter of fact, necessary to cause the release of the relay before proceeding with the further operation of the coin control trunk circuit. This release is obtained in the following manner.

Relay OHI by operating activates the gas tube timer circuit by removing at its break contact OHI-1 the short circuit path across capacitor CT, removes at its OHI-2 break contact the shunt path around resistor TR2 and connects that resistor in the series path with resistors TR1 and TRR, and completes at its OHI-3 make contact a path from battery, winding of relay T, make contact OHI-3 of relay OHI, break contact T-1 of relay T, break contact F2-2 of relay F2, break contact F1-2 of relay F1, resistor CR to cathode 22 of gas tube GT.

Capacitor CT charges through resistors TR2, TRR and TR1 to a voltage equal to the firing point of tube GT; it will be assumed that for the particular combination of resistors involved in the connection the charging period will be from .750 to 1.2 seconds. At the expiration of this timing period gas tube GT fires and operates relay T through current limiting resistor CR.

Relay T upon operating locks over a path from battery, operating winding of relay T, make contact OHI-3 of relay OHI, make contacct T-2 of relay T to ground, this locking path of course being under control of relay OHI.

Relay T upon operating also extinguishes gas tube GT by opening the previously traced path at its break contact T-1, and completes an operating path for relay C traced from battery, operating winding of relay C, make contact T-3 of relay T, make contact BF-4 of relay BF to ground on sleeve lead 19.

Relay C upon operating, locks through its make contact C-1 to the ground on lead 19, closes, through its make contact C-2, lead X to the winding of relay M, and interrupts at its break contact C-3 the operating path for relay OHI which thereupon releases.

Release of relay OHI opens at its make contact OHI-3 the holding path for relay T which thereupon releases, returns at its break contact OHI-2 the shunting path around resistor TR2 and returns at its break contact OHI-1 the shunting path across capacitor CT. The guarding function of relay OHI has now been removed from the circuit for the present and the circuit is in condition to perform the functions that are initiated by the distant operator.

*Coin Collect*

Let us assume, first, that the operator wishes to "collect" the coin or coins deposited at the called station and, accordingly, operates keys 14 and 15 at the switchboard (FIG. 1); this causes the switchboard trunk circuit 12 to operate in its normal manner to transmit a short "on-hook" signal or "wink" which may be, for example, of a duration of the order of from 75 to 130 milliseconds. The line relay of toll transmission selector 5 will respond, also in its normal manner of operation, by releasing at the start of the wink interval whereby to ground lead X of the circuit of FIG. 2.

Ground on lead X causes operation of relay M over a path through make contact C-2 of relay C, make contact TST-1 of relay TST, winding of relay M to battery; this results in release of relay TST due to the shunting path around the operating winding established through make contact M-1 of relay M. Relay M will hold operated through its M-3 make contact.

With relay M operated and relay TST released, a path is completed for operation of relay D, traced from ground, break contact TST-2 of relay TST, make contact M-2 of relay M, break contact D-1 of relay D, winding of relay D to battery; relay D operates and locks over a path from battery, operating winding and make contact D-2 of relay D, break contacts T-4 of relay T, RR-1 of relay RR and CC-1 of relay CC, lead 23 and make contact BF-4 of relay BF to the ground on lead 19.

Relay D operated prepares at its D-3 make contact a path for subsequent operation of relay TR and prepares at its D-4 make contact a holding path for relay OH.

Assuming that the called subscriber is off-hook, lead OHL will be grounded, as above described, and relay OH will be operated. Relay OH upon operating locks up over an obvious path which includes its OH-1 make contact and make contact D-4 of relay D. Relay OH, operated, prepares several paths which are involved in re-ring and which will be described subsequently in that connection.

At the end of the on-hook signal or wink interval, the line relay of toll transmission selector referred to above reoperates thereby removing ground from lead X and transmitting thereto the particular "inband" frequency, or combination of frequencies, assigned for initiation of "coin collect." As pointed out above, it is assumed for purposes of description that in the specific embodiment illustrated the "coin collect" frequency code is a combination of 700 c.p.s. and 1100 c.p.s.

Upon removal of the ground from lead X, relay M releases, since it was held to this ground; this is followed by reoperation of relay TST since the path shunting its operating winding is removed at make contact M-1. Upon interruption of the path to ground previously established through make contact M-2 of relay M and break contact TST-2 of relay TST, relay TR operates over a path from battery, resistor BR, winding of relay TR, make contact D-3 of relay D, make contact BF-4 of relay BF to ground on sleeve lead 19.

Relay TR, upon operating, locks up under control of relays T and BF over a path from battery, resistor BR, operating winding and make contact TR-1 of relay TR, break contact T-5 of relay T, make contact BF-4 of relay BF to sleeve ground. Also, operation of relay TR completes at its make contact TR-2 an alternate holding path for relay BF and completes at its make contact TR-3 an alternate holding path for relay OH, and, further, connects at its make contacts TR-4 and TR-5 respectively tip lead 17 and ring lead 18 over leads 24 and 26 to the receiver circuit (FIG. 3). At this same time tip lead 17 and ring lead 18 are opened at break contacts TR-6 and TR-7 in relation to the toll incoming trunk or other circuit associated with the coin control trunk circuit (FIG. 2).

In normal functioning of the circuits involved, the frequency codes are transmitted by the switchboard trunk circuit 12 immediately following the end of the wink interval. However under some transmission conditions, particularly if certain types of transmission equipment are included in the path, the control frequencies may be subject to delays in reaching the receiver, which delays on occasion may be of the order of 300 milliseconds. For this reason the gas tube timer circuit is provided and is adjusted for this particular function to have a minimum operating period of 385 milliseconds; this adjustment results from inclusion of resistors TRI and TRR in the charging path, relays RR and OHI both being in released position. The gas tube circuit is energized by the abovementioned operation of relay TR since the shunting path across capacitor CR is removed at break contact TR–8 and since a path is completed at make contact TR–9 for application of battery to cathode 22, this path being traced from battery, winding of relay T, make contact TR–9 of relay TR, break contact T–1 of relay T, break contact F2–2 of relay F2, break contact F1–2 of relay F1, resistor CR, cathode 22 of tube GT. The functioning of the timer circuit as a guard element in the event of nonarrival of the control frequency codes will be described in detail subsequently. In accordance with the novel features of the invention, and as described in detail subsequently, the timing interval of the timer circuit is automatically adjusted in accordance with the instant function of the circuit, this adjustment being accomplished by varying the resistance of the charging path.

As pointed out above the transistor receiver circuit (FIG. 3) was energized previously, that is at the time of the operation of relay BF following the grounding of sleeve lead 19 and resulting operation of relay TD. This energizing path was completed at make contact BF–1 of relay BF and resulted in the supply of suitable battery voltage over leads A1 and BL to the circuits of transistors 41, 42, 43 and 44. In the specific embodiment illustrated, the receiver circuit acts on the receipt of 700 c.p.s. (Re-ring) to ground lead PIL, on the receipt of 1100 c.p.s. (Coin Return) to ground lead P2L, and on the receipt of the combined frequencies 700 c.p.s. and 1100 c.p.s. to ground both leads PIL and P2L.

Filter 46 is designed to pass the frequencies near 700 c.p.s. with minimum attenuation, for example of the order of 3 db, while frequencies near 1100 c.p.s. are subjected to high attenuation, for example of the order of 35 db. Conversely, filter 47 passes frequencies near 1100 c.p.s. with minimum attenuation of the order of 3 db while frequencies near 700 c.p.s. are subjected to high attenuation of the order of 35 db. The amplifier associated with filter 46 for amplification of the frequencies passed thereby (700 c.p.s.) comprises transistor 41, resistors 48, 49, 51, 52 and 53 and capacitors 54 and 56. Resistor 52 is a voltage divider which provides a —24 volt supply; resistors 48, 49 and 51 establish the base to emitter operating bias and resistor 53 is the load resistor. Capacitor 54 is a bypass capacitor and capacitor 56 is a coupling capacitor.

The amplifier associated with filter 47 for amplification of the frequencies passed thereby (1100 c.p.s.) comprises transistor 42, resistors 57, 58, 59, 71 and 72, and capacitors 73 and 74. The functions of the elements just mentioned are the same respectively as those of the corresponding elements of the first described amplifier. Diodes 76 and 77 prevent transient surges from adversely affecting the respective two channels.

The switching stage associated with the first filter and amplifier comprises transistor 43, relay P1, diode 78, capacitor 79, variable resistor 81, thermistor 82, and resistors 83, 84 and 86. Resistor 83 is a voltage divider which provides —24 voltage to operate relay P–1; the relay winding provides the required load resistance. Thermistor 82 and variable resistor 81 are part of the transistor base biasing network, and, further, the thermistor adjusts for variations in temperature and the variable resistor adjusts for variations in transistor current gains. Resistor 84 functions to cause a voltage which will alternately forward bias and back bias diode 78. During the negative swing of the amplified signal, diode 78 is forward biased. Capacitor 79 will then charge to a negative voltage which will forward bias the transistor causing it to saturate. During the positive swing of the amplified signal, diode 78 is back biased, and before capacitor 79 is discharged sufficiently to cut-off transistor 43, diode 78 is again forward biased. Emitter resistor 86 provides a reverse bias for transistor 43 whereby to prevent thermal unbalances.

The switching stage associated with the second filter and amplifier comprises transistor 44, relay P2, diode 87, capacitor 88, variable resistor 89, thermistor 101 and resistors 102, 103 and 104. The functions of the elements just mentioned are the same respectively as those of the corresponding elements of the first described switching stage.

As pointed out above the coin collect code, combination of 700 c.p.s. and 1100 c.p.s., is now applied over leads 24 and 26 and through coupling transformer 106 to filters 46 and 47. The 700 c.p.s. as pointed out above is passed by filter 46 with minimum attenuation, and the filter output signal is amplified by the associated transistor amplifier, described in detail above, to drive transistor 43 into saturation. When transistor 43 is saturated, its collector voltage will increase and relay P1 will operate. In a similar manner the 1100 c.p.s. passed by filter 47 is amplified and causes operation of relay P2.

Relays P1 and P2, operated, complete at their respective make contact P1–1 and P2–1 obvious operating paths for relays F1 and F2 both of which now operate. Operation of either relay F1 or F2, or operation of course of both will recycle the timer circuit by opening the operate path of relay T at break contacts F2–2, F1–2 and by establishing a shunt path across capacitor CT at make contacts F2–3 and F1–3. Since relay OH is operated at this time, its make contact OH–2 is included in one of these shunting paths; in the event the relay were released, the path would then be completed through break contacts OH–3 and RR–2.

Operation of one or both of the relays also releases relay TD since the operate path therefor is opened at break contacts F1–1 of relay F1 and F2–1 of relay F2. Relay TD is made slow to release by the shunting path through its make contact TD–2 and resistor TDR; this delayed release is provided in order to provide time for the receiver circuit to stabilize and to prevent possible false operation of certain other relays.

The operation of relays F1 and F2 connects, at their respective make contacts F1–4 and F2–4, +110 v. coin potential to make contacts CC–2 and CC–3 of relay CC. Also, relay F2, operated, opens at its F2–6 break contact the operate path of relay RR thereby preventing operation of relay RR at this time. After release of relay TD as described above, relay CC operates over a path from battery, winding of relay CC, make contact F2–7 of relay F2, break contact TD–3 of relay TD, make contact BF–4 of relay BF to ground on sleeve lead 19.

Relay CC upon operating locks under control of relays T and BF over a path from battery, winding of relay CC, make contact CC–4 of relay CC, break contact T–6 of relay T, make contact BF–4 of relay BF to ground on sleeve lead 19. Following operation of relay CC, and with relays F1 and F2 operated, a holding path for relay F1 is established over a path from battery, winding and make contact F1–5 of relay F1, make contacts F2–5 of relay F2, make contact CC–9 of relay CC, to ground. Operation of relay CC also releases relay D, since it opens the holding path therefor at break contact CC–1, and, further, establishes at its CC–5 make contact a parallel holding path for relay TR. Also relay CC, operated, connects at its make contact CC–6 sleeve ground over lead 23 to lead HL which, in line with the normal operation of the step by step toll train and toll transmission selector 5 (FIG. 1), causes those circuits to connect the called line at this time to leads RA and TA of the coin control trunk circuit. Further, relay CC upon operating connects at its make contacts CC–2 and CC–3 the "coin collect" potential (+110 v.) to leads TA and RA; this potential serves to operate the usual coin controlling apparatus provided in the called pay station 13 to collect the coin or coins previously deposited.

The application of coin collect potential continues until the operator at the distant switchboard releases her coin collect keys or until the expiration of the coin control interval; the switchboard trunk circuit then functions to remove the frequency codes that are being sent to the receiver. Upon removal of the control frequencies the receiver (FIG. 3) functions to release relays P1 and P2 thus releasing relay F2. This is followed by release of relay F1 since the holding path therefor is opened at make contact F2–5. This sequence of release is provided in order to eliminate the possibility of coin return potential (−110 v.) being applied to the called line over leads RA and TA at break contact F1–6 of relay F1 in the event that relay were to release before the release of relay F2.

Relays F1 and F2, released, remove at their F1–4 and F2–4 make contacts, respectively, the coin collect potential from lines RA and TA, cause relay TD to reoperate to the sleeve ground by closing the operate path at break contacts F1–1 and F2–1 respectively, and start the gas tube timing circuit by removing at make contacts F2–3 and F1–3 respectively the paths shorting capacitor CT and by closing at break contacts F2–2 and F1–2 respectively the voltage path to tube GT.

It will be noted that following the release of relays F1 and F2 and while relay CC is still operated, leads RA and TA will drain or discharge into the network provided which comprises resistors RD and KR and capacitor DC.

The gas tube timer circuit operates as previously described above although in this instance it will be noted that resistor TR2 is shunted out of the charging path by break contact OH1–2 of relay OH1 since the relay is in released position at this time. With this combination of resistors the firing time of the circuit is assumed to be, for purposes of description, from 385 to 720 milliseconds. When this point is reached, the tube fires and relay T operates over a path previously described.

Relay T, upon operating, locks under control of relay TR over a path from battery, winding of relay T, make contact TR–9 of relay TR, make contact T–2 of relay T to ground. Also relay T, operated, extinguishes tube GT by opening the voltage path at its break contact T–1, opens at its break contact T–5 one of the parallel holding paths for relay TR thus putting relay TR under control of relay CC, and releases relay CC by opening at its break contact T–6 the holding path therefor.

Relay CC by releasing removes at its make contact CC–6 sleeve ground from lead HL (previously received over lead 23), and releases relay TR by opening the holding path therefore at make contact CC–5. Removal of the ground from lead HL causes the associated circuits referred to above to disconnect the called line from leads RA and TA of the coin control trunk circuit.

Relay TR, released, releases relay OH by opening at its make contact TR–3 the holding path therefor (relay D having previously released), disconnects at its TR–4 and TR–5 make contacts the receiver circuit from tip lead 17 and ring 18 and restores at break contacts TR–6 and TR–7 the normal through condition of these leads. Also, relay TR upon releasing releases relay T by opening the holding path therefor at make contact TR–9 and closes at break contact TR–8 a shunting path across capacitor CT. The circuit is now restored to normal, the only relays remaining operated being TD, BF, TST and C.

*Coin Return*

Coin return is accomplished by application of −110 v. coin potential to the called line instead of the +110 v. potential applied thereto for coin collect. The operation of the circuit is in general similar to that described above for coin collect. The operator at the distance office, however, in this instance closes her "coin return" key and this applies a control frequency code of 1100 c.p.s., following, of course, the completion of the wink interval. This frequency code when applied to the receiver circuit operates relay P2 only since, as pointed out above, frequencies of this value are passed by filter 47 with minimum attenuation but are subjected to high attenuation by filter 46. It follows, therefore, that relay F2 operates, but not relay F1. Coin return potential (−110 v.) is now applied to the called line over leads RA and TA through break contact F1–6 of relay F1 (unoperated) and make contact F2–4 of relay F2 (operated); the connection for supply of coin collect potential is, of course, open at make contact F1–4 of relay F1. In other regards the circuit operates as described above in connection with coin collect.

*Re-ring—Called Party Off-Hook*

Since certain phases of the re-ring operation are the same as those described in connection with coin collect and coin return, such phases will be treated only briefly, if at all, in the present connection. Operation of her "re-ring" key by the operator at the distant switchboard applies, first, a 75 to 130 microsecond on-hook signal or wink, and, as before, relay D operates at the beginning of the wink interval and relay TR operates at the end of the wink. Operation of relay TR starts the gas tube timer and connects the receiver circuit to tip 17 and ring 18 for reception of the 700 c.p.s. frequency code (re-ring) that is sent at the end of the wink interval. This frequency code operates only relay P1 of the receiver with resultant operation of relay F1 only (not F2). Operation of relay F1 recycles the timer circuit by closing a shunting path for capacitor CT through make contact F1–3 of relay F1 and make contact OH–2 of relay OH. Relay F1, operated, also prepares at its F1–7 make contact an operate path for relay RR, and releases relay TD by opening the operating path therefor at break contact F1–1. Upon release of relay TD relay RR operates over a path from battery, winding of relay RR, make contact F1–7 of relay F1, break contact F2–6 of relay F2, break contact TD–3 of relay TD, make contact BF–4 of relay BF to ground on sleeve lead 19.

Since the called party is off-hook, relay OH would have operated from the ground on lead OHL and would be held over a path through its own make contact OH–1 and make contact D–4 of relay D. (Relay OH–1 would also have operated but would have been released subsequently until required for its guard functions, in the manner above described.)

Relay RR upon operating locks under control of relay T over a path from battery, winding and make contact RR–3 of relay RR, break contact T–6 of relay T, make contact BF–4 of relay BF to ground on sleeve lead 19. Relay RR, operated, releases relay D by operating its holding path at break contact RR–1, completes at its make contact RR–4 a parallel holding path for relay TR, and applies through its make contact RR–5 ground to the MS lead of the ringing supply circuit (108); this is effective to start the ringing machine of the ringing supply circuit 108. Operation of relay RR also connects sleeve ground over a path which includes make contact BF–4 of relay BF, lead 23, make contact OH–4 of relay OH, and make contact RR–6 of relay RR; application of ground to lead HL is effective, as above described, to cause the associated circuit to connect the called line to leads RA and TA of the coin control trunk circuit. Further, operation of relay RR completes a path for application of ringing potential to lead RA (through resistance lamp RL, make contact F1–8 of relay F1, make contact RR–16 of relay RR and break contact CC–7 of relay CC) as well as a path for application of generator ground to lead TA (make contact F1–9 of relay F1, make contact RR–10 of relay RR and break contact CC–8 of relay CC).

The ringing current is impressed on the called line until the operator releases her re-ring key or until the expiration of the minimum period for application of the frequency code. At the end of the interval the switchboard trunk circuit functions to remove the 700 c.p.s. code whereupon the receiver circuit releases relay P1, following which relay F1 releases.

Relay F1, released, removes the ringing potential from the line, causes relay TD to reoperate, and causes certain other steps leading to restoring the circuit to normal as previously described above. It should be noted that in this instance when the gas tube timer circuit is started only resistor TRR is included in the charging path since resistor TR1 is shunted by a path through make contact RR–7 of relay RR and resistor TR2 is shunted by a path through break contact OH1–2 of relay OH1. For this condition the firing period of the circuit is assumed to be 160 to 295 mililseconds.

*Re-ring—Called Party On-Hook*

Assuming now that the called party is on-hook, the operation will be similar to that described except that in this instance relay OH will be in released position.

Relay RR operating as above described again locks to sleeve ground, releases relay D and completes a parallel holding path for relay TR. Also, relay RR upon operating opens at its break contact RR–8 the connection between sleeve lead 19 and the CL lead; this is effective to cause release of the "ring trip" relay of connectors 8 (FIG. 1) whereby to apply machine ringing to the called line. (The circuit arrangements involved in this step are not shown since they are a part of standard step-by-step switching circuits well known in the telephone switching art). Relay RR, operated, also connects through its make contact RR–9, lead CL to make contact T–7 of relay T, and removes at its break contact RR–2 the shunt path across capacitor CT (previously completed through make contact F1–3, of relay F1, break contact OH–3 of relay OH and break contact RR–2 of relay RR), thus allowing the capacitor to charge through resistor TRR as above described. (The timer is started at this time in order to assure the complete release of the ring trip relay referred to above before the S and CL leads are reconnected).

After the above mentioned interval of 160 to 295 milliseconds assumed for the charging path involving only the single resistor TRR, the tube fires and relay T operates as previously described. Relay T upon operating locks under control of relay TR to ground, (make contact T–2), extinguishes tube GT by opening the voltage path (break contact T–1), opens the holding path of relay TR through break contact T–5 thus putting relay TR under control of relay RR (make contact RR–4), and reconnects at make contact T–7 leads S, (19), and CL whereby to provide a holding path for the ring trip relay of the associated connector when the relay operates to trip ringing.

The circuit remains in this condition until the operator at the distant switchboard releases her re-ring key or until the minimum period for application of the control frequency code expires. At this point the switchboard trunk 12 functions to remove the 700 c.p.s. frequency code from the line; the receiver circuit responds by releasing relay P1 which, in turn, releases relay F1. Relay F1, released, restores at its F1–1 break contact the operate path for relay TD, and releases relay RR by opening the operate path therefor at make contact F1–7 (The previous holding path for relay RR was opened at break contact T–6 of relay T upon operation of that relay).

Relay RR, released, releases relay TR by opening the holding path at make contact RR–4, and transfers the control of lead CL from make contact T–7 of relay T to break contact RR–8 of relay RR.

The release of relay TR disconnects the receiver circuit from tip 17 and ring 19 and restores these leads to their normal through connection, releases relay T at make contact TR–9, and restores at break contact TR–8 the shunt path across capacitor CT. The coin control trunk circuit is now restored to normal condition, and ringing of the called line continues under control of the connector until the subscriber answers or the operator at the distant switchboard disconnects.

*Circuit Guards*

As pointed out above, certain important features of the present invention are involved in guard arrangements which are provided in order to prevent false operation of the control circuits due to conditions resulting from the normal, inherent operation of other portions of the system. For example, in accordance with the normal operation of the associated circuits involved, and as described above in connection with FIG. 1, when either a "trunk busy" or a "line busy" condition is encountered by the operator when dialing a called station, the flashing indication taking place in the associated circuit produced by interrupted ground (60 or 120 i.p.m.) will cause false alerting signals to appear on lead X of the coin control trunk circuit. As pointed out above, this flashing indication will originate in connector 8 (FIG. 1) in the event of a busy line, and in either intermediate selector 6 or 7 in the event of a trunk busy. Obviously the coin control trunk circuit should not be "alerted" by these signals for subsequent receipt of control frequencies from the distant switchboard, as is done when lead X is grounded following receipt of a legitimate on-hook or wink signal. In accordance with the novel arrangement contemplated by the present invention, "false alerting" of the coin control trunk circuit by the presence of the intermittent grounds on lead X is prevented; an important element in this guarding arrangement is relay OH1.

Through normal operation of the associated circuits, ground will be applied to lead OH of the coin control trunk circuit under either of two conditions. First, continuous ground will be applied to the lead from connector 8 in the event the called subscriber goes off-hook, and this ground will remain until the subscriber goes back on-hook. Secondly, in the event a trunk or line busy condition is encountered by the operator when dialing the called station, in intermittent ground, (60 or 120 i.p.m.) will be applied to the OHL lead from the switch train as described above. The novel arrangement contemplated by the invention distinguishes between these two conditions and prevents falsely alerting the control circuit in the event of the second condition.

When ground appears on lead OHL, due to either of the above conditions, relay OH1 operates over a path from ground, break contact C–3 of relay C, make contact BF–5 of relay BF, winding of relay OH1 to battery.

Relay OH1, operated, removes at its OH1–1 break contact the shunt path across capacitor CT, and starts the gas tube timer circuit by completing at its OH1–3 make contact a path from battery, winding of relay T, make contact OH1–3 of relay OH1, break contacts T–1 of relay T, F2–2 of relay F2 and F1–2 of relay F1, resistor CR to cathode 22 of gas tube GT. Since the shunt path around resistor TR2 is opened at break contact OH1–2 of relay OH1 and the shunt path around resistor TR1 is open at make contact RR–7 of relay RR, the charging path for this condition will include resistors TR1, TRR and TR2, and it will be assumed that for this charging path the firing period of the tube is from .750 to 1.2 seconds.

In the event the ground on lead OHL, (which is holding relay OH1 operated) is "steady," indicating a legitimate off-hook condition, the tube will fire after the timing interval of .750 to 1.2 seconds and relay T will operate as previously described. Relay T, operated, completes an operating path for relay C traced from battery, winding of relay C, make contact T–3 of relay T, make contact BF–4 of relay BF to ground on sleeve 19; relay C operates and holds through its C–1 make contact to sleeve ground, the X lead, previously open at make contact C–2, is now closed, i.e., "cut-through," and the circuit is in condition for normal operation.

Now, on the other hand, if the ground applied to lead OHL is intermittent, that is interrupted ground at either 60 or 120 i.p.m. indicating a line or trunk busy condition, relay OH1 will "follow" the ground intervals, that is the relay will operate and release intermittently in step with the gorund impulses. Relay OH1 by its intermittent action will start the timer circuit at the beginning of each ground impulse and will recycle the timer at the end of each impulse. The timer is not permitted to reach its firing point, therefore, and relay T does not operate. Consequently, relay C does not operate, lead X remains open at make contact C–2 of relay C and false alerting of the coin control trunk circuit by line or trunk busy indications is prevented.

It will be noted from the above that in accordance with the novel arrangement contemplated, relay OH1 in addition to other functions performed, also is effective to adjust the resistance value of the charging path in the timer circuit whereby to obtain the particular timing period of the timer circuit required for the particular condition.

In accordance with further features discussed below, the novel arrangement contemplated by the present invention is also effective to prevent possible false indications on the X lead (after relay C has operated to cut-through the X lead) resulting from "flashing recall" operations by the called subscriber, that is intermittently closing the subscriber's loop in order to flash or recall the operator. Because of the normal operations of the associated circuits, the flashing indications taking place therein cause corresponding ground impulses to appear on lead X. Unless compensated for, these impulses would, of course, falsely alert the coin control trunk circuit.

It will be recalled from the earlier description that relay TST operated from the sleeve ground after operation of relay BF, and it will be assumed for purposes of present description that relay C has operated as above described. Relay TST upon operation connected through its make contact TST–1 the operating winding of relay M to the X lead. When the subscriber flashes the operator a ground will be momentarily applied to lead X which will act to operate relay M. If the ground impulse be of sufficient duration to operate relay M, this will in turn start the release of relay TST due to the shunt path established through make contact M–1 of relay M. However, these ground indications due to subscriber flashing are of such short duration that the combined operate time of relay M and release time of relay TST will absorb each ground indication before it can be repeated and the coin control trunk circuit will not be falsely alerted due to subscriber flashing.

The timer circuit described is also effective in protecting the circuit against false on-hook or wink signals, or unduly delayed or non-arrival of frequency codes. A false wink occasionally results from malfunctions in the transmission path and refers to a condition in which no frequency codes are sent at the end of the wink interval. Also, a legitimate wink, on occasion, may not be followed by the usual control frequency codes due to the code being unduly delayed, or even lost altogether, in the transmission path. When the coin trunk circuit is alerted by a wink signal it has no way of discerning whether or not it is a false or a legitimate wink signal. Accordingly, in accordance with the arrangement contemplated, and as previously described above, when the TR relay operates at the termination of the wink signal, it starts the gas tube timer circuit, the charging path in this instance including resistors TRI and TRR and the firing interval accordingly being from 386 to 720 milliseconds. If the control tones do not arrive before the expiration of this interval the tube fires and the timer acts as above described to restore the circuit to normal. If the control tones do arrive during the interval, however, relays F1 and/or F2 will operate, the voltage path for the gas tube will be interrupted at break contacts F2–2 and/or F1–2 and the timer circuit will be recycled.

While certain specific embodiments of the invention have been selected for detailed disclosure, the invention is not, of course, limited in its application to the embodiments disclosed. The embodiments which have been described should be taken as illustrative rather than restrictive thereof.

What is claimed is:

1. In a telephone system, a station line, a coin box connected to said station line, a switchboard, an operator's position at said switchboard, means including a coin control trunk circuit for extending a connection between said switchboard and said station line, a plurality of sources of voice frequency control codes at said switchboard, a plurality of keys at said operator's position for controlling the transmission of selected control codes to said coin control trunk circuit, a circuit for receiving the transmitted codes and for initiating control functions in response thereto, means for connecting said receiving circuit to said coin control trunk circuit, a control line included in said coin control trunk circuit, said control line normally being in open condition, means for closing said control line, initial transmission of a control code being effective to apply a momentary ground to said control line whereby, when said line is in closed position, to condition said connecting means for subsequent operation when said ground is removed, said control line also being subject to intermittent grounding when a busy condition is encountered in attempting to complete a connection to said station line, and means for preventing the operation of said closing means while an intermittent ground is applied to said control line.

2. In a telephone system, a station line, a coin box connected to said station line, a switchboard, an operator's position at said switchboard, means including a coin control trunk circuit for extending a connection between said switchboard and said station line, a plurality of sources of voice frequency control codes at said switchboard, a plurality of keys at said operator's position for controlling the transmission of selected control codes to said coin control trunk circuit, a circuit for receiving the transmitted codes and for initiating control functions in response thereto, means for connecting said receiving circuit to said coin control trunk circuit, a control line included in said coin control trunk circuit, said control line normally being in open condition, means for closing said control line, initial transmission of a control code being effective to apply a momentary ground to said control line whereby, when said line is in closed position, to condition said connecting means for subsequent operation when said ground is removed, said control line also being subject to intermittent grounding when a busy condition is encountered in attempting to complete a connection to said station line, and means for preventing the operation of said closing means while an intermittent ground is applied to said control line, said preventing means including a gas tube timer circuit and means effective when said tube fires for operating said closing means.

3. In a telephone system, a station line, a coin box connected to said station line, a switchboard, an operator's position at said switchboard, means including a coin control trunk circuit for extending a connection between said switchboard and said station line, a plurality of sources of voice frequency control codes at said switchboard, a plurality of keys at said operator's position for controlling the transmission of selected control codes to said coin control trunk circuit, a circuit for receiving the transmitted codes and for initiating control functions in response thereto, means for connecting said receiving circuit to said trunk circuit, a control line included in said coin control trunk circuit, said control line normally being in open condition, means for closing said control line, initial transmission of a control code being effective to apply a momentary ground to said control line whereby, when said line is in closed position, to condition said connecting means for subsequent operation when said ground is removed, said control line also being subject to intermittent grounding when a busy condition is encountered in attempting to complete a connection to said station line, and means for preventing the operation of said closing means while an intermittent ground is applied to said control line, said preventing means including a gas tube timer circuit, means for automatically adjusting the timing interval thereof, and means effective when said tube fires for operating said closing means.

4. In a telephone system, a station line, a coin box connected to said station line, a switchboard, an operator's position at said switchboard, means including a coin control trunk circuit for extending a connection between said switchboard and said station line, a plurality of sources of voice frequency control codes at said switchboard, a plurality of keys at said operator's position for controlling the transmission of selected control codes to said coin control trunk circuit, a circuit for receiving the transmitted codes and for initiating control functions in response thereto, means for connecting said receiving circuit to said trunk circuit, a first control line and a second control line included in said coin control trunk circuit, said first control line normally being in open condition, means for closing said first control line, initial transmission of a control code being effective to apply a momentary ground to said first control line whereby, when said line is in closed position, to condition said connecting means for subsequent operation when said ground is removed, means for connecting a steady ground to said second control line when the loop at said station line is closed, said first and said second control lines also being subject to intermittent grounding when a busy condition is encountered in attempting to complete a connection to said station line, and means for preventing the operation of said closing means while an intermittent ground is applied to said control lines, said preventing means including a relay connected to said second control line operating either intermittently or steady according to the nature of the ground applied to said second control line.

5. In a telephone system, a station line, a coin box connected to said station line, a switchboard, an operator's position at said switchboard, means including a coin control trunk circuit for extending a connection between said switchboard and said station line, a plurality of sources of voice frequency control codes at said switchboard, a plurality of keys at said operator's position for controlling the transmission of selected control codes to said coin control trunk circuit, a circuit for receiving the transmitted codes and for initiating control functions in response thereto, means for connecting said receiving circuit to said trunk circuit, a first control line and a second control line included in said coin control trunk circuit, said first control line normally being in open condition, means for closing said first control line, initial transmission of a control code being effective to apply a momentary ground to said first control line whereby, when said line is in closed position, to condition said connecting means for subsequent operation when said ground is removed, means for connecting a steady ground to said second control line when the loop at said station line is closed, said first and said second control lines also being subject to intermittent grounding when a busy condition is encountered in attempting to complete a connection to said station line, and means for preventing the operation of said closing means while an intermittent ground is applied to said control lines, said preventing means including a gas tube timer circuit, a relay connected to said second control line operating either intermittently or steady according to the nature of the ground applied to said second control line, operation of said relay being effective to start said timer circuit and release of said relay being effective to recycle said timer circuit, and means effective only when said tube fires for operating said closing means.

6. In a telephone system, a station line, a coin box connected to said station line, a switchboard, an operator's position at said switchboard, means including a coin control trunk circuit for extending a connection between said switchboard and said station line, a plurality of sources of voice frequency control codes at said switchboard, a plurality of keys at said operator's position for controlling the transmission of selected control codes to said coin control trunk circuit, a circuit for receiving the transmitted codes and for initiating control functions in response thereto, means for connecting said receiving circuit to said trunk circuit, a first control line and a second control line included in said coin control trunk circuit, said first control line normally being in open condition, means for closing said first control line, initial transmission of a control code being effective to apply a momentary ground to said first control line whereby, when said line is in closed position, to condition said connecting means for subsequent operation when said ground is removed, means for connecting a steady ground to said second control line when the loop at said station line is closed, said first and said second control lines also being subject to intermittent grounding when a busy condition is encountered in attempting to complete a connection to said station line, and means for preventing the operation of said closing means while an intermittent ground is applied to said control lines, said preventing means including a gas tube timer circuit, a relay connected to said second control line operating either intermittently or steady according to the nature of the ground applied to said second control line, means effective upon operation of said relay for starting the charging interval of said timer circuit, means effective upon release of said relay for stopping the operation of said timer circuit, means also effective upon operation of said relay for adjusting the characteristics of said timer circuit whereby the timing interval of the timer circuit will exceed the intervals between the intermittent grounds, and means effective only when said tube fires for operating said closing means.

7. In a telephone system, a station line, a coin telephone station connected to said line, a remote switchboard, a coin control trunk circuit for extending a connection between said switchboard and said station line, means at said switchboard for transmitting to said coin control trunk circuit an alerting tone and subsequent coin control tones, timer means in said coin control trunk circuit for restoring said coin control trunk circuit to normal upon occurrence of an alerting tone without a subsequent coin control tone, and means in said coin control trunk circuit for preventing false operation of said coin control trunk circuit on occurrence of busy conditions encountered in completing a path to said coin telephone station, said last-mentioned means including said timer means and means for changing the operating time interval of said timer means.

8. In a telephone system, a station line, a coin box connected to said station line, a remote switchboard, means including a coin control trunk for extending a connection between said switchboard and said station line, means at said switchboard for transmitting coin control signals to said coin control trunk, a control line included in said coin control trunk, means responsive to initial transmission of a coin control signal to apply a ground signal to said control line to condition said control trunk for subsequent transmisison of said control signals, means including timer means having a first definite timer interval for removing said condition if said subsequent control signals are not transmitted to said control trunk, and means for preventing spurious operation of said trunk control means on occurrence of grounds on said control line due to busy conditions encountered in attempting to complete a connection to said line, said last-mentioned means including said timer means and means for changing the timer interval of said timer means.

9. In a telephone system, the combination set forth in claim 8 further comprising ringing signal means for applying re-ring signals to said coin box and means for restoring said coin control trunk to normal after application of said re-ring signals to said coin box, said restoring means including said timer means and means responsive to the application of said re-ring signals to said coin box for changing the timer interval of said timer means to a third distinct interval.

10. In a telephone system, the combination as set forth in claim 9 wherein said timer means comprises a gas tube timer circuit including a plurality of resistances and said means for changing the timer interval of said timer means both include means for determining the connection of said resistances in said timer circuit.

References Cited in the file of this patent

UNITED STATES PATENTS 2,955,161 Faulkner ---------------- Oct. 4, 1960